United States Patent [19]

Lombardi et al.

[11] Patent Number: 5,151,642

[45] Date of Patent: Sep. 29, 1992

[54] APPARATUS FOR CONTROLLING AN ELECTRIC MOTOR

[75] Inventors: Steven A. Lombardi, Waukesha; Richard D. Marasch, Germantown, both of Wis.

[73] Assignee: Allen-Bradley Company, Inc., Milwaukee, Wis.

[21] Appl. No.: 518,352

[22] Filed: May 3, 1990

[51] Int. Cl.⁵ .............................................. H02P 1/28
[52] U.S. Cl. .................................................... 318/779
[58] Field of Search ............... 318/786, 778, 779, 729, 318/809; 323/901, 321, 238

[56] References Cited

U.S. PATENT DOCUMENTS

| | | | |
|---|---|---|---|
| 3,946,293 | 3/1976 | Feld | 318/799 |
| 4,052,648 | 10/1977 | Nola | 318/200 |
| 4,266,177 | 5/1981 | Nola | 318/810 |
| 4,361,792 | 11/1982 | Davis, Jr. et al. | 318/729 |
| 4,426,614 | 1/1984 | Nola | 323/243 |
| 4,433,276 | 2/1984 | Nola | 318/729 |
| 4,439,718 | 3/1984 | Nola | 318/729 |
| 4,469,998 | 9/1984 | Nola | 318/729 |
| 4,581,568 | 4/1986 | Fitzpatrick et al. | 318/729 |
| 4,806,838 | 2/1989 | Weber | 318/729 |
| 4,912,390 | 3/1990 | Curran, Sr. et al. | 318/729 |

Primary Examiner—David Smith, Jr.
Attorney, Agent, or Firm—Quarles & Brady

[57] ABSTRACT

A motor controller includes a set of thyristors which couple the motor to a source of alternating electricity. A detector senses when the voltage of the source makes a zero crossing. A mechanism is provided to vary the frequency of a clock signal at a rate determined by a user selectable input which represents the rate at which the motor speed is to change during starting or stopping. The clock signal is applied to a counter which produces an active trigger signal when a given number of clock signal cycles have been counted following a zero crossing of the source voltage. The active trigger signal causes a brief trigger pulse to be applied to gate electrodes of the thyristors. The varying frequency of the clock signal alters the relative times at which the thyristors are triggered to vary the amount of voltage applied to the motor. Different frequency variation functions can be stored in a memory for the starting and stopping modes.

17 Claims, 5 Drawing Sheets

TIMING MODULE 61

APPARATUS FOR CONTROLLING AN ELECTRIC MOTOR

The present invention relates to equipment for controlling the application of power to electric motors, and particularly to such equipment which alters the magnitude of the voltage applied to the motor during starting and stopping.

BACKGROUND OF THE INVENTION

When an electric motor is started by simply connecting the motor directly to the power supply lines (across the line starting), the electric current drawn by the motor can be six times the steady state current once it reaches full operating speed. In addition, the motor torque rises dramatically with this starting technique and such a rise can adversely affect the mechanical components driven by the motor.

In order to reduce the start up current and torque surges, large alternating current motors often are coupled to the electricity supply lines by thyristor switches operated (i.e. triggered or fired) by a controller. When the motor is to be started, the equipment operator applies a starting signal to the motor controller which controls the thyristors to gradually increase the magnitude of the voltage applied to the motor. This is achieved by regulating the period during each half cycle of the alternating supply voltage in which the thyristors are conductive. By gradually increasing the period of conduction, a greater amount of voltage is applied to the motor producing a commensurate increase in motor speed. An inverse technique can be used to decrease the motor speed.

Typically these motor controllers fall into two classes. One of the classes was an analog system as shown in U.S. Pat. No. 3,376,485 in which saw tooth waveforms synchronized to the cyclical supply voltage are thresholded to determine the firing times for the thyristors. By varying the threshold with time, the magnitude of the voltage applied to the motor can be gradually increased or decreased. The other type of motor controllers are digital, often incorporating microprocessors to control the thyristor firing times, as disclosed in U.S. Pat. No. 4,862,052. The microprocessor controllers execute a software program which responds to input signals indicating when the supply voltage and current make zero magnitude crossings. These zero crossing times are used as timing references from which to determine when the thyristors should be fired.

SUMMARY OF THE INVENTION

A controller has a switch assembly which couples an electric motor to a source of alternating electricity. A detector senses when the voltage of the source makes a zero magnitude crossing. A first counter is reset by a signal from the detector which indicates a zero voltage crossing, and thereafter counts the cycles of a clock signal. When a predefined number of cycles have been counted, the first counter causes a trigger pulse to be applied to the switch assembly to couple electricity to the motor.

The frequency of the clock signal is varied in different operational modes of the controller to alter the magnitude of the voltage applied to the motor. In the preferred embodiment of the controller, the circuit for varying the clock signal frequency includes a device which produces a reference signal having a frequency which is user definable. The reference signal determines the rate at which a second counter increments or decrements a reference number depending upon whether the motor speed is to be increased or decreased. In this embodiment, the reference number output from the second counter is applied to the N input of a programmable divide-by-N counter to produce the clock signal from a reference clock signal. The frequency of the clock signal varies as the reference number changes.

This controller has particular application to starting and stopping the motor in a regulated manner. To start the motor, the second counter sequentially increments the reference number and thereby increases the clock signal frequency. As the frequency of the clock signal increases, the first counter is clocked at a faster rate, reaching its predefined number of cycles faster and triggering the switch assembly progressively sooner after a zero voltage crossing. The inverse process occurs to stop the motor so that the clock frequency decreases and the switch assembly is triggered progressively later and later.

A further embodiment of the present invention also allows the basic controller system to perform power factor economizing during full speed operation. In this mode, the phase difference between the voltage and current which supply the motor is measured. The measured phase difference is compared to a reference value, measured during motor starting for example. Depending upon the result of the comparison, the reference number is altered to vary the clock signal frequency and the switch trigger time. In this manner, the trigger time is varied to maintain the measured phase difference substantially equal to the reference value.

DETAILED DESCRIPTION OF THE INVENTION

Figure 1:
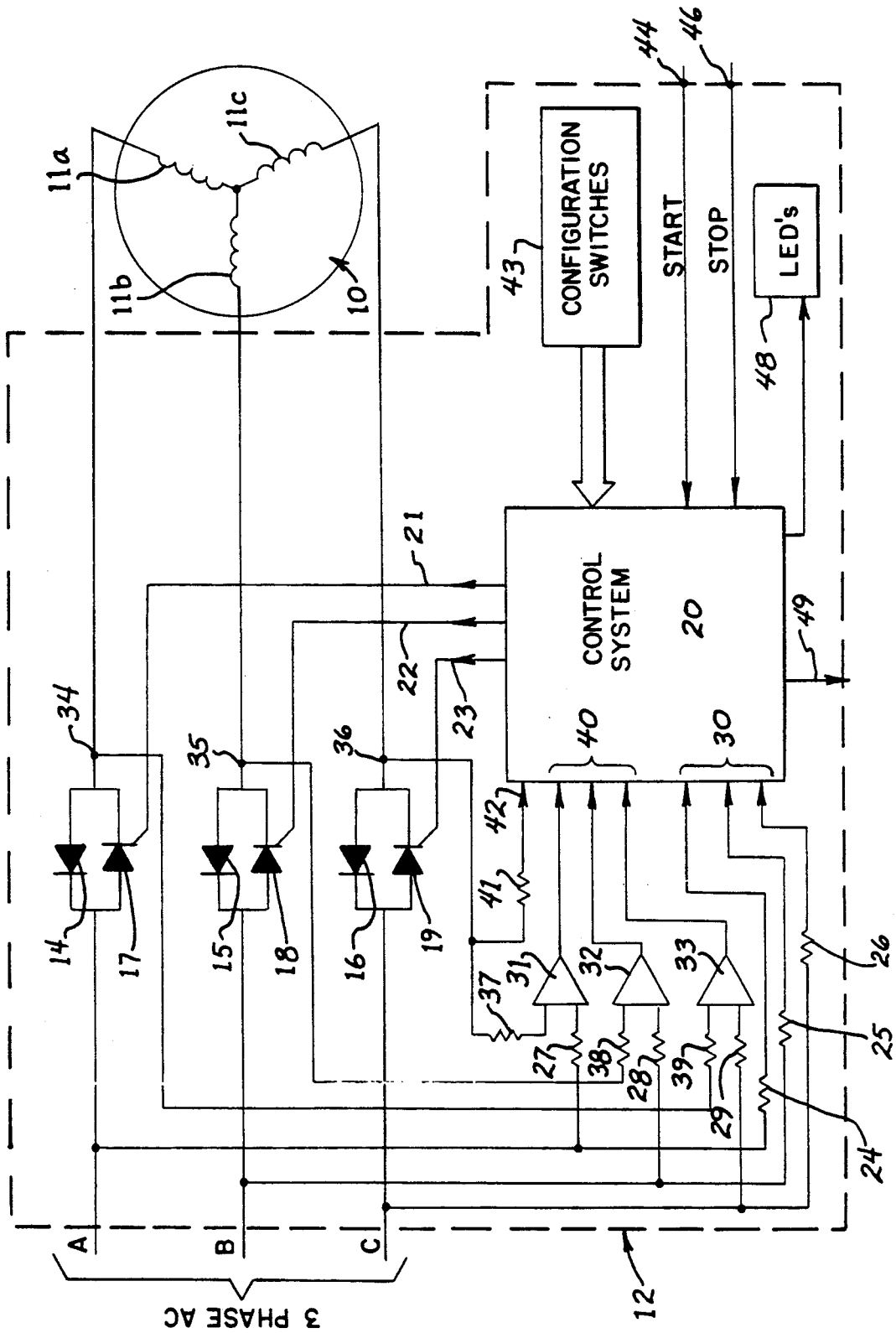
FIG. 1 is a schematic diagram of a motor and a controller which incorporates the present invention.

With initial reference to FIG. 1, a three-phase motor 10 has three stator winding 11a, 11b and 11c. The application of alternating electricity to the motor 10 is regulated by a motor controller 12. The stator windings 11a, 11b and 11c are connected to a three-phase source of alternating current (AC) by three supply lines A, B, and C and three diodes 14, 15 and 16. Connected across each of the diodes 14, 15 and 16 in an inverse parallel manner is a separate silicon controlled rectifier (SCR) 17, 18 or 19, respectively. Therefore, each inverse parallel connected diode and SCR pair couples one of the stator windings 11a-c to supply lines A, B, or C. Alternatively, each of the diodes 14-16 can be replaced by another SCR that is triggered into a conductive state during the entire half-cycle of the supply voltage in which it is forward biased. This alternative prevents the supply current from leaking through a motor that is turned off.

The SCR's 17-19 are triggered into a conductive state by a pulse applied over lines 21, 22 and 23 from a control system 20 to the gates of the SCR's. In order to determine the proper times at which to emit the SCR trigger pulses, the control system 20 receives a number of input signals indicating electrical parameters of the AC source and the motor 10. Specifically, each of the three supply lines A, B and C is connected by a separate voltage dropping resistor 24, 25 and 26 to a trio of inputs 30 of the control system to provide signals indicating the zero crossings and the polarity of the voltage on each of the three supply lines. The signals at inputs 30 are collectively referred to herein as "supply line voltage signals". The three supply lines A, B and C are also coupled by three additional voltage dropping resistors 27, 28 and 29 to an input of three separate differential amplifiers 31, 32 and 33, respectively. The other inputs of the three differential amplifiers are coupled by voltage dropping resistors 37, 38 and 39 to nodes 34, 35 and 36 between one of the diode/SCR pairs and the associated motor stator winding 11a-c. The outputs of the three differential amplifiers 31-33 indicate the conductive state of the SCR 17, 18 or 19 for the supply line to which the amplifier is connected. During the half cycle of the supply line voltage when the diode for that line is reversed biased and the SCR is forward biased, the voltage across the SCR will be relatively high if the SCR is not conducting, as compared to the voltage level when it is conducting. The outputs of the differential amplifiers 31-33 indicate the relative voltage level across the SCR's and therefore whether each is conducting current. The signals from these differential amplifiers are collectively referred to herein as "supply line current signals" and are applied to another set of three control system inputs 40.

The node 36 for supply line C also is coupled by voltage dropping resistor 41 to an input 42 of the control system 20 to provide an indication of the back emf voltage generated in the motor 10 when current is not flowing through diode 16 or SCR 19. When this back emf voltage is opposite in polarity to the polarity of the C supply line voltage, the motor 10 is stalling. A stalling condition exists when the torque supplied by the motor is substantially less than the load torque. As will be described, the sensing of when the motor is in a stalling condition is used by the control system 20 to determine its mode of operation.

Still referring to FIG. 1, a set of configuration switches 43 is coupled to other inputs of the control system 20 allowing the user of the motor controller to set the different parameters and modes of operation. These switches permit the user to select the mode of motor starting from among an across the line start, a soft start in which the magnitude of the voltage applied to the motor is gradually increased with time, or a mode in which the applied voltage remains constant for a period of time before switching to full voltage. An additional switch selects whether the motor 10 under load will be allowed simply to coast to a stop or whether the voltage will be gradually decreased providing a soft stop. Two additional groups of the configuration switches 43 are used to define the rate of acceleration and deceleration for the motor during the starting and stopping modes. A further group of switches define an initial torque level for the motor. Another switch selects whether power factor economizing is to occur when the motor is in the full speed run mode, as will be described. Other switches are used to enable fault detection and the operating mode for an output relay to be described.

Terminals 44 and 46 provide inputs to the control system 20 for a pair of external signals indicating when the motor is to be started or stopped. The control system 20 also generates output signals coupled to a light emitting diode (LED) 48 which indicates the status of the control system. A pair of output lines 49 is coupled to a relay contacts in the control system which close when the motor has started or is operating at full speed.

Figure 2:
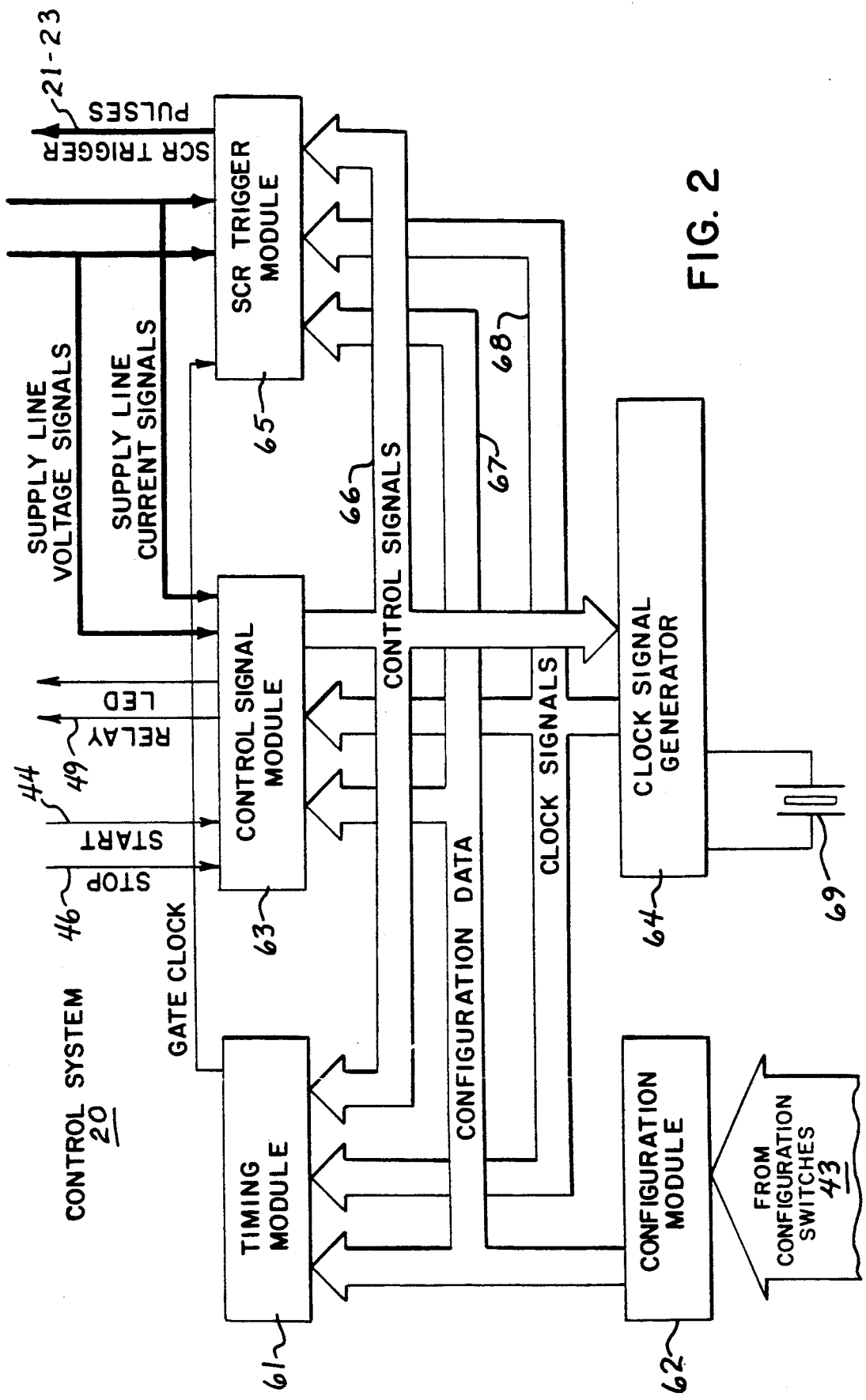
FIG. 2 illustrates the control system shown in FIG. 1.

With reference to FIG. 2, the control system 20 consists of five functional modules 61-65 interconnected by a series of control signal lines 66, configuration data lines 67 and clock signal lines 68. The configuration switches 43 are coupled to a configuration module 62 which responds to switch settings by producing signals on the configuration data lines 67. A clock signal generator 64 divides a 500 KHz. reference signal generated by an external crystal 69 to derive a plurality of different frequency clock signals for the system modules. The function and frequencies of the different clock signals will be described subsequently.

A control signal module 63 is coupled to the start and stop input terminals 44 and 46 of the motor controller 12 and issues control signals on lines 66 to a timing module 61 and an SCR trigger module 65 indicating whether the motor controller is in the start or the stop mode. The control signal module 63 also receives the supply line current signals from differential amplifiers 31-33 which indicate when the current is not flowing from the supply lines A, B and C to the motor 10 and thereby the times at which the SCR's 17, 18 or 19 turn off. These current signals also are sent to the SCR trigger module 65. The control signal module also provides output signals for driving the LED and the relay coupled to output lines 49.

The control signal module 63 and SCR trigger module 65 both receive the voltage parameter signals from input lines 30 and 42. The supply line voltage signals applied to inputs 30 are connected to zero crossing detectors within the control signal module 63 to produce timing reference signals which indicate when the voltage in each of the supply lines crosses the zero voltage axis.

Input 42, to which is applied the voltage at node 36 of supply line C, and the input in trio 30 from supply line C are applied to a differential amplifier within the control signal module 63 to produce a signal indicative of whether the polarity of the two voltages, with respect to the neutral of the electricity source, are the same or opposite. It is well-known that when a motor is stalling, the polarity of the voltage induced in a winding of the motor by the back emf is opposite to the polarity of the supply line voltage for that winding. Therefore, by comparing the voltage on either side of the SCR 19 when that SCR and the diode 16 are not conducting, a determination can be reached as to when the motor is beginning to stall (i.e. in a stalling condition). A signal designated STALL is generated in the control signal module 63 is transmitted over lines 66 to the timing module 61. The STALL signal is active during motor starting until the motor substantially reaches its full running speed. Therefore, as will be described in detail, the STALL signal is utilized to indicate when the motor controller 20 can switch from the starting mode to the full speed running mode. The STALL signal is also utilized for the economizing function when the motor is in normal running mode, as will be described.

Figure 4:
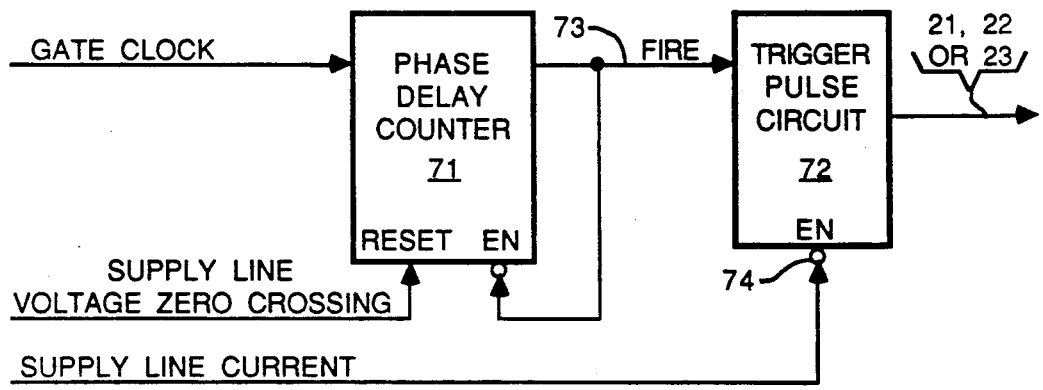
FIG. 4 is a schematic diagram of a portion of the firing circuit in FIG. 2.

The SCR trigger module 65 includes three identical sub-circuits, one for each of the three supply lines A, B or C and the corresponding SCR 17, 18 or 19. FIG. 4 illustrates one of these sub-circuits which has a phase delay counter 71 and an SCR trigger pulse generating circuit 72. The clock input for the phase delay counter receives a signal designated GATE CLOCK from the timing module 61. The reset input of the phase delay counter 71 receives a brief pulse via lines 66 from the control signal module 63 whenever the corresponding supply line voltage crosses through the zero magnitude (i.e. the neutral potential). Therefore, the count within the phase delay counter 71 is reset upon the occurrence of each zero voltage crossing and thereafter counts the GATE CLOCK pulses from the timing module 61.

When the phase delay counter 71 reaches a predetermined fixed count, an output signal line 73 goes high providing a signal, designated "FIRE", indicating that the appropriate SCR should be triggered (or fired). The FIRE signal is fed back to the active-on-low enable terminal of the phase delay counter 71 to disable the counter to maintain a constant high level output signal until reset at the next zero voltage crossing. The FIRE signal on line 73 also is applied to a conventional SCR trigger pulse generating circuit 72, which produces an active SCR trigger pulse on an output line 21, 22 or 23 (See FIG. 2) as long as the FIRE signal is high and the signal at its enable input 74 is low. This enable input 74 is coupled to the supply line current signal from the corresponding differential amplifier 31, 32 or 33. As long as current is not flowing through the associated SCR 17, 18 or 19, an active trigger pulse is generated on output line 21, 22 or 23. However, once a current begins to flow through the SCR, the respective differential amplifier 31-33 generates a high level supply line current signal which disables the trigger pulse circuit 72 terminating the SCR trigger pulse. Thus, the generated SCR trigger pulse has a duration which is just long enough to render the SCR conductive, where it normally remains until the alternating supply line current goes to zero. As long as the phase delay counter 71 is producing a high level FIRE signal on line 73, should the SCR prematurely turn off, a low level supply line current signal will re-enable the trigger pulse circuit 72 to generate another SCR trigger pulse.

The SCR trigger module sub-circuit illustrated in FIG. 4 triggers the associated SCR 17, 18 or 19 upon a fixed number of cycles (or pulses) of the GATE CLOCK signal after the corresponding supply line voltage makes a zero crossing. As long as the GATE CLOCK signal has a constant frequency, the associated SCR will be triggered at a constant phase delay from each zero voltage crossing. However, as will be described in detail, the timing circuit module 61 varies the frequency of the GATE CLOCK signal during soft starting and stopping of the motor in order to vary the phase angle at which the SCR's are triggered. Altering this clock signal frequency produces an increase or decrease in the amount of voltage being applied to the motor 10.

Figure 3:
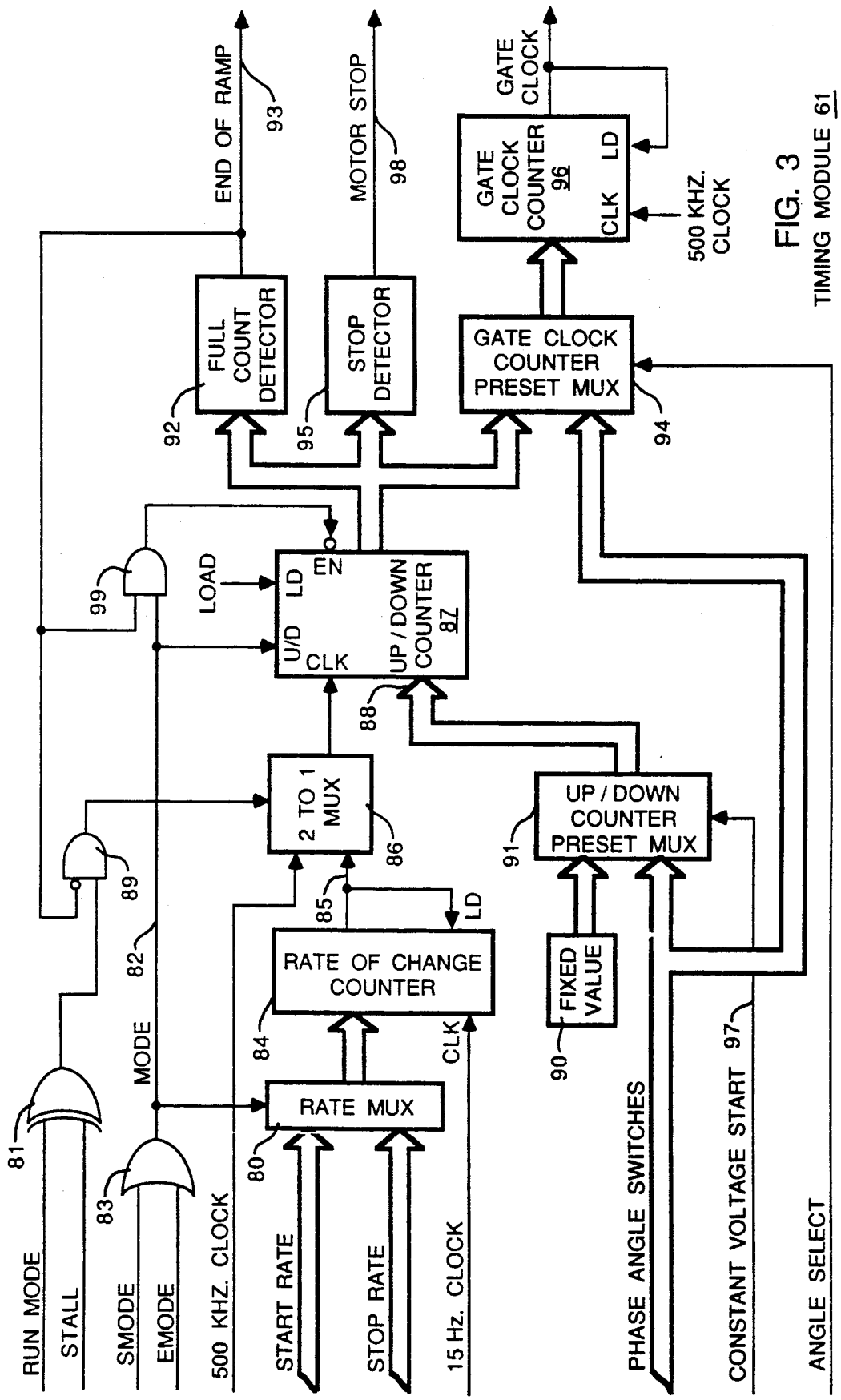
FIG. 3 is a block diagram of the timing module shown in FIG. 2.

FIG. 3 illustrates the principal components of the timing module 61 which generate and vary the frequency of the GATE CLOCK signal. The two sub-sets of the configuration switches 43 which numerically define the acceleration rate during motor starting and the deceleration rate during motor stopping apply signals designated START RATE and STOP RATE to separate groups of inputs of a rate multiplexer (MUX) 80. The rate multiplexer 80 couples the numerical value defined by one group of inputs to its output lines depending upon whether the motor controller 12 is in the start or the stop mode as indicated by a MODE signal on line 82. The MODE signal is produced on line 82 by OR gate 83 in response to a signal, designated SMODE, from the control signal module 63 indicating whether the motor controller 12 is in the starting or stopping mode. OR gate 83 also receives a signal designated EMODE from the control signal module 63 during the economizing mode, as will be described.

The output of the rate multiplexer 80 is applied to the count preset input of a divide-by-N rate of change counter 84. A fifteen Hertz (Hz.) signal from the clock signal generator 64 is applied to the clock input of this counter 84. The rate of change counter 84 produces a pulsed output signal on line 85 at a rate equal to the fifteen Hertz signal divided by the numerical value (N) from the rate multiplexer 80. The output signal frequency from the rate of change counter 84 determines the rate at which the SCR phase delay changes and as a result, the starting or stopping time of the motor 10.

The output signal from the rate of change counter 84 is applied to one input of a 2-to-1 multiplexer 86. A 500 KHz. clock signal from the clock signal generator 64 is applied to the other input of the 2-to-1 multiplexer 86. The selected input of the multiplexer 86 is coupled from its output to the clock input of an up/down counter 87, having its up/down control input coupled to the MODE signal line 82. The up/down counter 87 also receives a load enable signal from the control signal module 63 to preset the counter with the numerical value applied to its preset input 88. The circumstances under which the up/down counter 87 is loaded with the preset value will be described subsequently with respect to the operation of the timing module 61.

The preset value for loading into the up/down counter 87 is produced at the output of a up/down counter preset multiplexer 91. A group of configuration switches 43 which defines an initial phase angle at which the SCR's are triggered during motor starting, and thereby the initial motor torque, is coupled to one set of inputs of multiplexer 91. The other set of inputs to the up/down counter preset multiplexer 91 are coupled to a network defining a fixed numerical value representing the starting interval for the constant voltage mode of operation to be described. Multiplexer 91 couples one input set to the preset input of the up/down counter 87 in response to a signal on line 97 from the control signal module 63 indicating when the motor controller 20 is in the constant voltage start mode.

Referring still to FIG. 3, the count output from the up/down counter 87 is applied to a full count detector 92 which determines when the count output has reached its maximum value (e.g. all "one" bits). When this occurs, the full count detector 92 produces a high logic level signal, designated END OF RAMP, on its output line 93 to thereby indicate when starting voltage has been ramped up to substantially its full magnitude. The END OF RAMP signal is applied to the inverting input of a first AND gate 89. A regular input of first AND gate 89 receives the output of an exclusive OR (XOR) gate 81 to which the STALL signal is applied by the control signal module 63 when the motor stalling condition exists. The control signal module also applies a RUN MODE signal to the XOR gate 81 which signal is a high level when the motor controller 12 is in the full running speed mode and a low level in the start or stop mode. The output of the first AND gate 89 is connected to the selector input of the 2-to-1 multiplexer 86 to select between the 500 KHz. clock signal or the signal on line 85 from the rate of change counter 84. A second AND gate 99 also receives the END OF RAMP signal at one input and the MODE signal at another input. The output of the second AND gate 99 is connected to the enable input of the up/down counter 87. The END OF RAMP signal on line 93 also is coupled to an input of the control signal module 63.

A stop detector 95 receives the count output of the up/down counter 87 to detect when the count has a predefined relatively small value. As will be described, when the count reaches this value in the soft stop mode, the motor 10 has essentially reached a complete stop. In response to detecting this predefined value, the stop detector issues a MOTOR STOP signal on line 98 to the control signal module 63.

The count output from the up/down counter 87 also is applied to one set of inputs of a gate clock counter preset multiplexer 94. The other set of inputs of the gate clock counter preset multiplexer 94 are coupled to the phase angle switches in the set of configuration switches 43. The gate clock counter preset multiplexer couples one set of its inputs to the preset inputs of a gate clock counter 96 in response to an ANGLE SELECT signal from the control signal module 63. The gate clock counter 96 is incremented by a 500 KHz. reference clock signal to count up from the preset value and produce a GATE CLOCK signal pulse at its carry output when the maximum count is reached. The output of the gate clock counter 96 is connected to its load terminal, so that each pulse of the GATE CLOCK signal reloads the counter with the preset value from multiplexer 94. The frequency of the resultant GATE CLOCK signal is determined by the magnitude of the numerical value from multiplexer 94; the greater that magnitude the higher the GATE CLOCK frequency. The GATE CLOCK signal from the gate clock counter 96 is fed to the subcircuits in the SCR trigger module 65 (See FIGS. 2 and 4).

The motor controller 12 has a number of modes of operation which the user enables by properly setting the configuration switches 43. The modes which are of particular interest with respect to the present invention relate to the starting and stopping of the motor in a controlled manner. Two principal types of controlled starting may be selected in which the voltage applied to the motor during starting remains either constant for a given interval of time or is gradually increased until the motor reaches substantially full speed. A controlled stopping mode may also be enabled so that the magnitude of voltage applied to the motor is gradually decreased until the motor comes essentially to a complete stop. When the motor is in the starting, running or stopping stage, the timing module 61 is configured to generate a GATE CLOCK signal that triggers the SCR's in a pattern according to the mode of operation enabled for that stage. The operation of the timing module 61 during each of these starting and stopping operation modes shall be discussed individually.

Constant Voltage Starting

With reference to FIGS. 2 and 3, when the user has selected the constant voltage starting mode and a start signal is applied to terminal 44, the control signal module 63 sends the corresponding set of control signals to configure the timing module 61 accordingly. Specifically, a timing module reset signal (not shown) is sent to reset the timing module components and load preset values into counters 84 and 96. At the same time, the control signal module 63 is applying an active CONSTANT VOLTAGE START signal on line 97 to the selector input of the up/down counter preset multiplexer 91. This signal causes the up/down counter preset multiplexer 91 to couple the numerical value from the fixed value network to the preset input 88 of the up/down counter 87. In the constant voltage mode of operation, the up/down counter acts as a timer for the interval during which the constant magnitude starting voltage is to be applied to the motor. A signal from the control signal module 63 designated LOAD is applied to the up/down counter to load the numerical value applied to the preset input 88 into the counter 87. This value is chosen so that the up/down counter 87 will reach its maximum count at the end of the desired interval.

The length of the constant voltage starting interval also is determined by the rate at which the up/down counter 87 is clocked. This rate is generated by circuit components 80, 84 and 86. In the starting mode, the control signal module 63 is issuing a high level SMODE signal which produces a high MODE signal on line 82 to indicate that the motor controller 12 is in the start mode. This MODE signal places the up/down counter 87 in the up count configuration to increment its count upon receiving each pulse at its clock input. The MODE signal also causes the rate multiplexer 80 to select the START RATE input from the configuration switches 43. The numerical value of the START RATE presets the rate of change counter 84 determining the frequency of its output signal on line 85 and thereby ultimately the constant voltage interval length.

During the initial phase of the start mode, the motor torque is less than the load torque and an active high level STALL signal is applied via XOR gate 81 to AND gate 89. The END OF RAMP signal also applied to AND gate 89 will be low. The resultant output of the AND gate 89 causes the 2-to-1 multiplexer 86 to select the output on line 85 from the rate of change counter 84 to apply to the clock input of the up/down counter 87. This latter counter is incremented by each pulse from the rate of change counter 84 to time the starting interval.

In the constant voltage start mode, the setting of the phase angle switches determines the phase angle of the AC voltage at which the SCR's for each supply line are triggered. Therefore, prior to the end of the starting interval, the signals from the phase angle switches in the set of configuration switches 43 are coupled to the preset input of the gate clock counter 96 by the gate clock counter preset multiplexer 94 in response to the ANGLE SELECT signal from the control signal module 63. The counter preset value designated by the phase angle switches produces the lower frequency GATE CLOCK signal from the 500 KHz. reference clock signal. This lower frequency signal determines the frequency at which the phase delay counter 71 in the SCR trigger module 65 (See FIG. 4) is incremented. In the constant voltage mode of operation, the GATE CLOCK signal frequency is constant, thereby causing the SCR's to be triggered at the same phase angle throughout the starting interval.

The end of the constant voltage starting interval is indicated by the up/down counter 87 reaching its maximum count at which all of its output lines are at a high logic level. This maximum count is sensed by the full count detector 92 which responds by producing a high logic level END OF RAMP signal on output line 93. The active high level END OF RAMP signal informs the control signal module 63 that the constant voltage start interval has elapsed. The END OF RAMP signal also toggles the output of the second AND gate 99 disabling the further incrementation of the up/down counter 87 freezing the maximum count.

Then, the phase angle delay of the supply line voltage at which the SCR's are triggered is rapidly decreased to render the SCR's conductive during substantially the entire half cycle of the voltage. To accomplish this, the high level END OF RAMP signal causes the output of first AND gate 89 to go low. This results in the 2-to-1 multiplexer 86 selecting the 500 KHz. clock signal for clocking the up/down counter 87. The high level END OF RAMP signal also causes the control signal module 63 to remove the active CONSTANT VOLTAGE START signal on line 97. This results in the up/down counter preset multiplexer 91 applying the numerical value set by the phase angle switches to the preset input 88 of the up/down counter 87. The control signal module 63 also issues a LOAD signal to the up/down counter causing the phase angle switch value to be loaded into the counter. This loading changes the output of the up/down counter 87 from the maximum value, thereby causing the END OF RAMP signal to disappear and re-enabling the counter 87.

Then the control signal module 63 toggles the ANGLE SELECT signal commanding multiplexer 94 to apply the output of the up/down counter 87 to the preset input of the gate clock counter 96. As a result, the output of counter 87, not the phase angle switch settings, determines the GATE CLOCK signal frequency. The 500 KHz. signal clocking the up/down counter 87 quickly increases the GATE CLOCK frequency producing a rapid shortening of the phase angle delay at which the SCR's 17-19 are triggered. Eventually, the SCR's will be conductive during substantially the entire half-cycle of the AC voltage and the motor will be at full speed. By ramping up the voltage at the end of the start interval from the constant voltage level to full voltage, a step function increase in motor speed and torque is avoided.

Alternatively, if a step function increase in motor torque is not a concern, the SCR's simply can be triggered into a constant conductive state when either the END OF RAMP signal goes active or the STALL signal goes inactive.

Soft Start

Instead of the constant voltage starting mode, the user may enable a "soft-start" mode in which the motor controller 12 gradually increases the voltage applied to the motor to produce a commensurate increase in speed. To do so, the SCR's 17-19 for each phase are triggered at successively shorter voltage phase angles to become conductive during greater portions of the half-cycle of the supply line voltages. For this operation, the timing module 61 gradually increases the GATE CLOCK signal frequency applied to the SCR trigger module 65. As this frequency increases, the phase delay counters 71 for each supply line sub-circuit in FIG. 4 are clocked at faster rates to produce a successively shorter phase angle delay.

Referring to FIGS. 2 and 3, when the soft start mode has been selected, the control signal module 63 sends signals to the timing module 61 to place its circuitry into the soft start configuration. Specifically, the control signal module 63 applies an active high level start/stop mode signal (SMODE) which produces a high level MODE signal on line 82 from OR gate 83. In addition to placing the up/down counter 87 in the up counting state, this high MODE signal causes the rate multiplexer 80 to couple the START RATE signals, that originate from the acceleration rate configuration switches 43, to the preset (or N) input of the divide-by-N rate of change counter 84. The START RATE signal is a number that divides the fifteen Hertz clock signal applied to the rate of change counter 84 thereby producing a lower frequency output signal on line 85. That output signal represents the rate at which the trigger phase angle for the SCR's is to be changed.

In the initial phase of the soft start mode, the STALL signal at an input of XOR gate 81 is an active high level and the RUN MODE signal at the other input is held low in the start mode. Therefore, the XOR gate 81 has a high level output coupled to AND gate 89 which also at this time receives a low the END OF RAMP signal on line 93. As a consequence the output of AND gate 89 causes the 2-to-1 multiplexer 86 to pass the divided frequency on line 85 from the rate of change counter 84 to the clock input of the up/down counter 87.

The CONSTANT VOLTAGE START signal on control line 97 is a low level causing the up/down counter preset multiplexer 91 to select the set of inputs which receive the signals from the phase angle configuration switches 43. These signals from the phase angle configuration switches provide a numerical value to the preset input 88 of the up/down counter 87 defining the initial voltage phase angle at which the SCR's 17-19 are triggered during starting, and thereby the initial torque generated by the motor. This numerical value is loaded into the counter by a LOAD signal pulse received from the control signal module 63 at the outset of the starting operation. With each subsequent cycle of the output signal from the rate of change counter 84, the up/down counter increments it count starting from the value loaded from the phase angle configuration switches.

In the soft start mode the ANGLE SELECT signal from the control signal module 63 causes the gate clock counter preset multiplexer 94 to couple the output of the up/down counter 87 to the gate clock counter 96. As the numerical output of the up/down counter 87 increases, the gate clock counter 96 is periodically preset with a larger number thereby progressively requiring fewer pulses of the 500 KHz. clock signal before a GATE CLOCK pulse is produced at its carry output. As a result the frequency of the GATE CLOCK pulses correspondingly increases. Each pulse of the GATE CLOCK signal reloads the gate clock counter 96 with the current value from the up/down counter 87.

As the frequency of the GATE CLOCK signal increases, the phase delay counters shown in FIG. 4 are clocked at faster rates thereby decreasing the phase delay between a zero crossing of the supply line voltage and when the SCR's are triggered. This renders the SCR's conductive for progressively longer periods applying a greater amount of voltage to the motor 10 and increasing its speed.

Eventually, the up/down counter 87 will reach its maximum count so that all of its output lines are a high level (a binary one) at which time the SCR's 17, 18 and 19 are being triggered at the shortest phase angle producible by the soft start phase angle ramping. This maximum count is sensed by the full count detector 92 which responds by producing an active high level END OF RAMP signal on line 93. The END OF RAMP signal is fed back via AND gate 99 to disable the up/down counter 87 from further incrementation, thereby freezing its maximum count so that it does not roll over. Therefore, the count which presets the gate clock counter 96 remains constant at this point and the gate clock signal is held at its highest frequency derived by the timing module 61. The END OF RAMP signal indicates to the control signal module 63 that the starting phase has ended and the motor controller 12 makes a transition into the full speed running mode. In the normal full speed running mode, the output of the up/down counter 87 remains held at its maximum value to apply the full supply line voltage to the motor 10.

It is possible under some circumstances during starting, that the motor 10 will leave the stalling condition before the up/down counter 87 has reached its maximum value. In this case, it is desirable to increase the voltage applied to the motor to full line voltage as rapidly as possible since the motor already is substantially at full speed. When the stalling condition disappears, the STALL signal applied through XOR gate 81 to an input of the first AND gate 89 goes low. This action toggles the AND gate output which results in the 2-to-1 multiplexer 86 coupling the 500 KHz. clock signal directly to the clock input of the up/down counter 87; thereby producing a very rapid incrementation to its maximum count. As a consequence the frequency of the GATE CLOCK signal rapidly increases which in turn quickly decreases the phase angle delay for triggering the SCR's 17, 18 and 19.

Soft Stop

In a manner which is similar to the way in which the SCR trigger phase angle delay is decreased during the soft start mode, the trigger phase angle delay may be increased to provide a gradual controlled slowing of the motor during the stopping mode. In order to decrease the speed of the electric motor 10, the GATE CLOCK signal frequency is decreased to provide a longer voltage phase delay in the SCR trigger module 65. The timing module 61 illustrated in FIG. 3 operates in much the same manner as just described with respect to the soft start mode except the MODE signal on line 82 is low due to a low level start/stop mode (SMODE) signal from the control signal module 63. The EMODE signal is forced low during the stopping mode. The low level MODE signal places the up/down counter 87 in the down count state so that the count is decremented upon each pulse from the 2-to-1 multiplexer 86. In addition, the MODE signal on line 82 causes the rate multiplexer 80 to select the set of configuration switches 43 which indicate the STOP RATE and apply those signals to the count preset input of the rate of change counter 84. This enables the user to select the rate that the voltage is decreased and, as a result, the amount of time it takes to stop the motor 10.

At the outset of the stopping, the RUN MODE and STALL signals are low causing the 2-to-1 MUX 86 to apply the 500 KHz clock signal to the up/down counter 87. Thus, the counter 87 is being clocked at high speed to quickly alter the GATE CLOCK signal and SCR triggering. This clocking rapidly decreases the voltage applied to the motor.

Eventually the STALL signal goes high (active) forcing MUX 86 to couple the output of the rate of change counter 84 to the clock input of the up/down counter 87. The stop rate switch settings determine the frequency of the signal on line 85 that the rate of change counter 84 produces from the fifteen Hertz clock signal, and thereby slow the rate of decrementation of the up/down counter 87. As the numerical value from the up/down counter 87 decreases, a smaller number is passed through multiplexer 94 to the preset input of the gate clock counter 96. Therefore, sequentially smaller numbers are periodically loaded into the gate clock counter, thereby requiring a greater number of cycles of the 500 KHz. reference clock signal before a pulse of the GATE CLOCK signal is produced.

Eventually, the decrementation of the up/down counter 87 produces such a small numerical output value that the SCR's 17-19 are conductive for so short an interval of time that the motor has slowed almost to a complete stop. When this predefined small numerical output value is sensed by the stop detector 95, a MOTOR STOP signal is produced at its output 98 coupled to the control signal module 63. This signal causes the motor controller 12 to cease all application of electricity to the motor allowing it to come to a complete stop, if it has not already done so.

Economizing Operation

In addition to providing control of the motor during starting and stopping, the motor controller 12 can be configured to perform power factor economizing during full speed operation of the motor. With such an economizing technique, the phase difference between the voltage and current in one of the supply lines (e.g. line C) is measured and stored as a reference value when the motor torque first exceeds the load torque during motor starting. When economizing is active, the GATE CLOCK signal frequency is adjusted so that the SCR conduction periods maintain the actual phase difference between the voltage and current approximately equal to the stored reference value. However, should a high level STALL signal appear, indicating that the motor torque is significantly less than the load torque, full voltage is applied to the motor for a period of time and the reference phase difference is increased for use when the full voltage period elapses and the economizing operation resumes.

Figure 5:
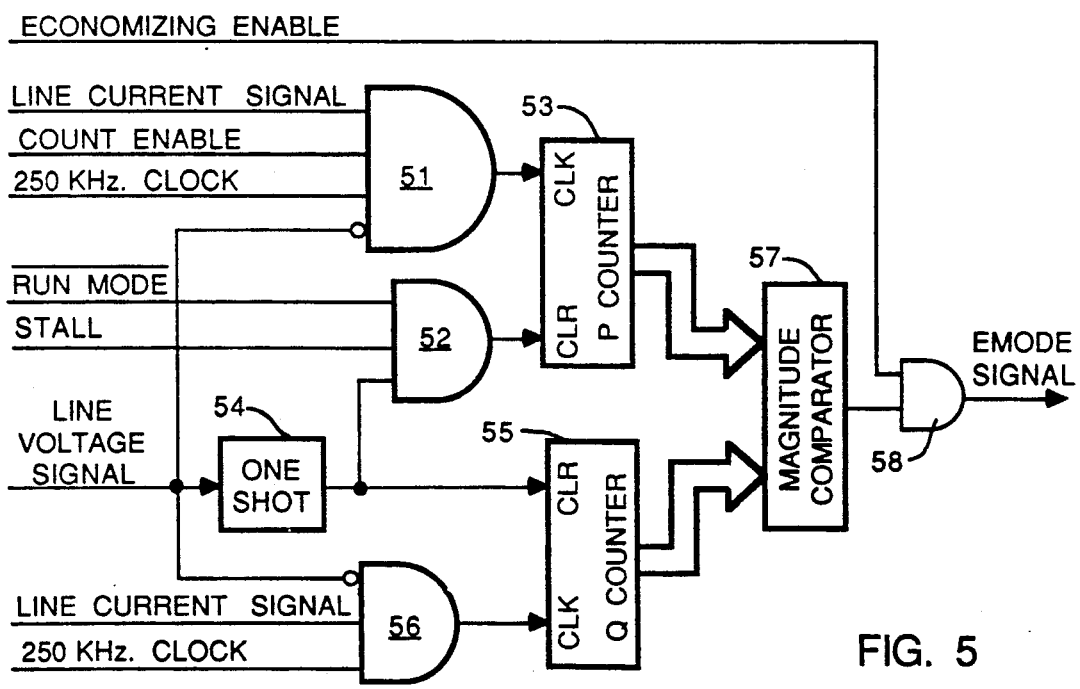
FIG. 5 is a diagram of circuit that is incorporated in the timing module to perform an economizing function.

To perform this function, the control signal module 63 contains an economizing circuit 50 shown in FIG. 5, which generates the EMODE signal for the timing module 61. During the start mode, this circuit 50 receives a high level COUNT ENABLE signal and a high level $\overline{\text{RUN MODE}}$ signal from within the control signal module 63. The COUNT ENABLE signal along with the supply line voltage and current signals for supply line C at control system inputs 30 and 40, and a 250 KHz. clock signal are applied to a four-input AND gate 51. The output of the four-input AND gate 51 is connected to the clock (CLK) input of a counter 53 which is designated as the P counter. The clear (CLR) input to the P counter 53 is coupled to the output of a three-input AND gate 52. The $\overline{\text{RUN MODE}}$ and STALL signals are applied to two inputs of AND gate 52 and the third input receives the output from a monostable multivibrator (one shot) 54. The one-shot 54 is triggered by the falling edge of the supply line C voltage waveform, which edge occurs on a positive to negative zero crossing.

While the motor 10 is starting, the P counter 53 is cleared by each pulse from the one-shot 54, i.e. on every positive to negative zero voltage crossing. The counter then is incremented by each pulse of the 250 KHz. clock signal until the C supply line current signal goes low when the current flowing through SCR 19 ceases. At that point, the count in the P counter represents the interval between the voltage and current zero crossings and thereby corresponds to the phase difference between voltage and current in supply line C. This count is held until the P counter 53 is reset by another pulse from one-shot 54 upon next negative going supply line voltage zero crossing during motor starting.

The P counter 53 continues measuring the voltage and current phase difference until the STALL signal goes low when the motor 10 is near full speed. When this occurs, the motor controller enters the run mode and the control signal module 63 sets both the $\overline{\text{RUN MODE}}$ and COUNT ENABLE signals to low logic levels, thereby disabling the P counter and freezing its count. This count represents the phase difference when the motor left the stalling condition and serves as a reference phase difference for the economizing mode.

Once the motor 10 has reached full speed, the control system 20 checks one of the configuration switches 43 to determine if the user has selected the economizing function. If the function has been chosen, a high ECONOMIZING ENABLE signal is supplied to the circuit 50 in FIG. 5. In the run mode, the activated economizing circuit 50 performs a periodic comparison of the actual phase difference between the voltage and current of supply line C to the reference phase difference stored in the P counter 53. A second counter 55, designated as the Q counter, measures the voltage-current phase difference while the motor 10 is in the run mode. The Q counter 55 is cleared by the one-shot 54 upon every positive to negative zero crossing of the C supply line voltage. The clock input of the Q counter 55 is connected to the output of another three input AND gate 56. AND gate 56 receives the C supply line voltage signal at an inverting input, along with the C supply line current signal and the 250 KHz. clock signal at regular inputs. As long as the supply line voltage is negative and the current is positive, the Q counter tabulates the clock signal pulses. Therefore, the Q counter 55 also measures the interval between when the voltage and the current make negative going zero crossing and this interval corresponds to the present phase difference between voltage and current of the supply to the motor 10.

The periodically present phase difference is applied from the Q counter 55 to one input of a multiple bit digital magnitude comparator 57. Another input of the magnitude comparator 57 receives the output of the P counter 53 representing the reference voltage current phase difference. A high level output signal from the comparator 57 indicates that the reference phase difference in the P counter 53 is greater than or equal to the present phase difference in the Q counter 55. Inversely, a low logic level output from magnitude comparator 57 designates that the reference phase difference is less than the present phase difference.

The output of the magnitude comparator 57 when economizing is enabled in the run mode generates a high or low EMODE signal. The EMODE signal is applied to OR gate 83 of the timing module 61 in FIG. 3 to control the GATE CLOCK signal frequency and thereby the SCR conduction periods. In the run mode the SMODE signal is held low so that the EMODE signal can control the timing module. When the Q counter's value is greater than the P counter value, the EMODE signal places the up/down counter 87 in the down count state to decrease the number applied via multiplexer 94 to the preset input of the gate clock counter 96. This action decreases the frequency of the GATE CLOCK signal and produces a commensurate increase in the phase delay for triggering the SCR's, reducing their conduction period. As a result, the voltage applied to the motor 10 is decreased due to the SCR's 17-19 being conductive for a shorter period.

The motor voltage sequentially decreases from the full line voltage, until the present voltage-current phase difference represented by the contents of the Q counter 55 is less than the reference phase difference represented by the P counter value. When this occurs, the EMODE signal is toggled to place the up/down counter 87 in the up count state resulting in an increase the frequency of the GATE CLOCK signal and the conduction period of the SCR's.

When economizing is active, the value in the Q counter 55 representing the actual voltage-current phase difference oscillates about the reference value in the P counter 53. In this state, the timing module 61 alternates increasing and decreasing the frequency of the GATE CLOCK signal by a slight amount. The economizing technique applies a minimum amount of electricity to the motor, but a sufficient amount to prevent the motor 10 from stalling.

However, should the STALL signal appear in this mode, the timing module 61 rapidly increases the GATE CLOCK signal to its maximum frequency so that the full supply line voltage is applied to prevent the motor 10 from actually stalling completely. Referring to FIG. 3, when economizing is active a high level RUN MODE signal is applied to one input of XOR gate 81 causing the XOR gate to invert the STALL signal. In the normal running state, the STALL signal is low (inactive) thus sending a high level signal from XOR gate 81 through AND gate 89 (END OF RAMP signal is now low) to the 2-to-1 multiplexer 86. This causes the multiplexer 81 to couple the low frequency rate of change counter output signal to the clock input of the up/down counter 87. However, when stalling occurs, the high level STALL signal is inverted to a low level by XOR gate 81 causing the 2-to-1 multiplexer 86 to apply the 500 KHz. clock signal to the up/down counter 87. The stalling condition also causes the control signal module to issue a high SMODE signal to force the up/down counter 87 into the up counting state. These combined actions rapidly increment the count in the up/down counter to its maximum value, thereby increasing the GATE CLOCK frequency and the SCR conduction periods. Quickly, the SCR's become conductive for the entire half-cycle in which they are forward biased applying the full supply line voltage to the motor 10.

The full voltage is applied to the motor 10 for a fixed period before returning to economizing operation by decreasing the GATE CLOCK signal frequency as initially occurred upon entering the run mode. However, before returning to economizing the value in the P counter 53 in FIG. 5 is incremented slightly to avoid the onset of another stalling condition. To do so, the control signal module 63 issues a high level COUNT ENABLE signal for a brief interval while the current and voltage signals for supply line C are at high and low levels, respectively. This allows the four-input AND gate 51 to pass a few pulses of the 250 KHz. clock signal, thereby incrementing the P counter 53. Alternatively, if the 250 KHz. clock signal provides too great an incrementation of the P counter, a lower frequency clock signal (e.g. 250 Hz.) can be applied to the P counter 53 after the initial count has been stored. The control system 20 may cycle through the stalling state and P counter incrementation several times until the value of the P counter 53 is increased so that a stalling no longer occurs. Thus, the reference phase difference is dynamically adjusted for varying load conditions.

Figure 6:
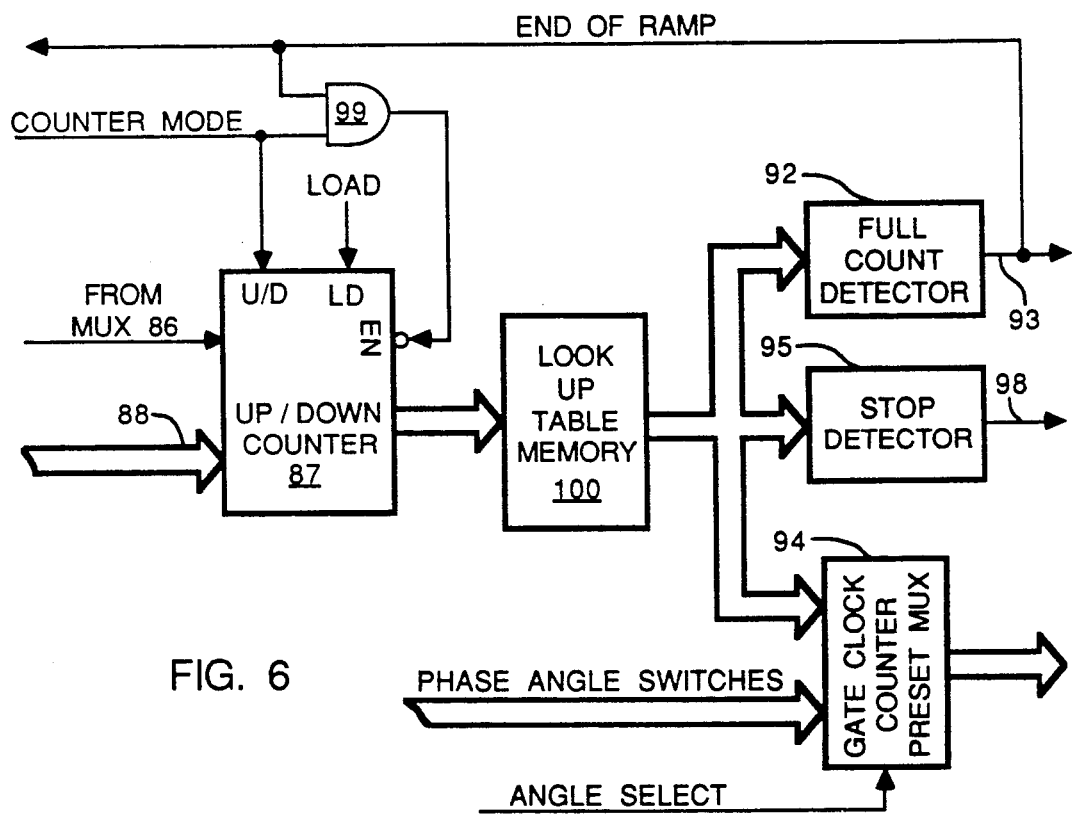
FIG. 6 is a schematic diagram of an alternative embodiment of a portion of the timing module in FIG. 3.

FIG. 6 illustrates an alternative embodiment for a portion of the timing module circuitry shown in FIG. 3. In the original embodiment, the output of the up/down counter 87 is coupled directly to the gate clock counter preset multiplexer 94 and thereafter to the gate clock counter 96. This coupling produces a linear variation of the GATE CLOCK signal frequency and hence, the phase angle at which the SCR's 17–19 are triggered during starting and stopping. In the alternative embodiment, the output of the up/down counter 87 is connected to address inputs of a look-up table memory 100. The data output lines of the memory 100 are connected to the inputs to the full count detector 92, the stop detector 95, and the gate clock counter preset multiplexer 94.

The count output of the up/down counter 87 addresses the memory 100. The contents of the addressed memory location is applied to components 92, 94 and 95 in place of the counter's output. By loading appropriate values into the memory, the linear up/down counter incrementation or decrementation can be transformed into a non-linear function for altering the gate clock signal frequency, and thereby the SCR trigger angles. The memory 100 can store separate look up tables for the starting and stopping modes, thus providing different transformation functions.

We claim:

1. An apparatus for controlling the application of electricity to an alternating current electric motor comprising:
   a switch means coupling the electric motor to a source of alternating electricity and being of a type which is conductive from the moment of application of a trigger pulse until the magnitude of alternating current therethrough goes to zero;
   means for detecting a periodically occurring condition of the alternating electricity from the source, and producing a control signal indicating an occurrence of the condition;
   means for producing a clock signal having a frequency which varies at different rates to alter the amount of electricity applied by said switch means to the motor;
   a means for generating a count of cycles of the clock signal and producing a trigger pulse when the count reaches a first predefined number, said means for generating being coupled to said means for detecting to set the count to a second predefined number in response to the control signal; and
   means for applying the trigger pulse to said switch means.

2. The apparatus as recited in claim 1 wherein the control signal produced by said means for detecting indicates when the voltage of the electricity from the source makes a zero crossing.

3. The apparatus as recited in claim 1 wherein said means for producing the clock signal comprises:
   means for supplying a reference signal having a given frequency;
   means for setting a rate at which the frequency of the clock signal is to vary;
   means, coupled to said means for setting, for dividing the frequency of the reference signal by a factor which varies at a rate determined by said means for setting, thereby producing the clock signal.

4. The apparatus as recited in claim 1 further comprising:
   means for measuring a phase difference between the voltage and current of the electricity from the source to produce a first phase difference measurement at a predefined time during the operation of the motor and to periodically produce a second phase difference measurement;
   means, connected to said means for measuring a phase different, for comparing the first and second phase difference measurements; and
   wherein said means for producing the clock signal varies the frequency of the clock signal in response to said means for comparing so that trigger pulses are applied to said switch means at times which maintain the second phase difference measurement substantially equal to the first phase difference measurement.

5. The apparatus as recited in claim 4 wherein the predefined time during the operation of the motor is determined by a relationship between the magnitudes of a motor torque and a load torque acting on the motor.

6. The apparatus as recited in claim 5 wherein the predefined time during the operation of the motor is the first time after the motor is started that the a motor torque is equal to or greater than the load torque.

7. The apparatus as recited in claim 4 further comprising means for indicating when the current from the source of alternating current makes a zero crossing; and wherein:
   said means for detecting provides an indication when the voltage of the electricity from the source makes a zero crossing;
   said means for measuring a phase difference includes a first counter and a first means, that is responsive to both said means for detecting and said means for indicating, for clocking the first counter at a given rate during the interval between an occurrence of a zero crossing of the voltage from the source and an occurrence of a zero crossing of the current to produce the first phase difference measurement, and also includes a second counter and a second means, that is responsive to both said means for detecting and said means for indicating, for clocking the second counter at the given rate during the interval between an occurrence of a zero crossing of the voltage from the source and an occurrence of a zero crossing of the current to produce the second phase difference measurement; and
   said means for comparing receives output signals from the first and second counters.

8. An apparatus for controlling the application of alternating electricity to an electric motor comprising:
   a switch means coupling the electric motor to a source of alternating electricity in response to a trigger pulse;
   means for setting a rate at which the frequency of a clock signal is to vary;
   a first frequency divider means for producing a first signal having a frequency determined in response to said means for setting a rate;

a first means for counting cycles of the first signal and producing a count thereof;

a second frequency divider means for producing a clock signal having a frequency determined in response to said the count from said first means for counting; and a second means for counting cycles of the clock signal and producing an output signal when a predefined number of cycles have been counter; and means for applying a trigger pulse to said switch means in response to the output signal from said second means for counting.

9. The apparatus as recited in claim 8 wherein said first means for counting includes a means for presetting its count to a defined value.

10. The apparatus as recited in claim 9 further comprising means for detecting when the count of the first means for counting reaches a given magnitude and issuing a signal indicative thereof.

11. The apparatus as recited in claim 10 further comprising means for disabling the first means for counting in response to the signal indicative of the count reaching the given magnitude.

12. The apparatus as recited in claim 8 further comprising:

a voltage sensing means for providing a first indication when the magnitude of the voltage of the source makes a zero crossing; and a current sensing means for providing a second indication when the magnitude of the current form the source makes a zero crossing.

13. The apparatus as recited in claim 8 further comprising:

a voltage sensing means for producing an indication when the magnitude of the voltage of the alternating electricity from the source makes a zero crossing; and means for resetting said second means for counting to a predefined value, in response to an indication from said voltage sensing means.

14. The apparatus as recited in claim 8 further comprising means for detecting when a voltage generated in the motor by a back electromotive force is opposed in polarity to the voltage from the source and producing an indication thereof.

15. The apparatus as recited in claim 14 further comprising means for coupling a second signal to said first means for counting, in response to the indication from said means for detecting, so that said first means for counting counts cycles of the second signal in place of cycles of the first signal.

16. The apparatus as recited in claim 14 further comprising:

a first means for measuring a phase difference between the voltage and current of the alternating electricity from the source when said means for detecting indicates that the voltage generated in the motor by the back electromotive force is opposed in polarity of the voltage from the source, thereby producing a first phase difference measurement;

a second means for periodically measuring a phase difference between the voltage and current of the alternating electricity rom the source, thereby producing a second phase difference measurement;

means for comparing the first and second phase difference measurements; and wherein the frequency of the clock signal also is determined in response to the means for comparing to maintain the second phase difference measurement substantially equal to the first phase difference measurement.

17. The apparatus as recited in claim 8 further comprising a look-up-table memory having a plurality of storage locations, a storage location address signal input to which the count from said first means for counting is applied, and a data output coupled to said second frequency divider.

* * * * *

UNITED STATES PATENT AND TRADEMARK OFFICE
CERTIFICATE OF CORRECTION

PATENT NO. : 5,151,642

DATED : September 29, 1992

INVENTOR(S) : Steven A. Lombardi et al.

It is certified that error appears in the above-identified patent and that said Letters Patent is hereby corrected as shown below:

In Column 16, at line 16, change "different" to --difference--.

In Column 17, at line 9, change "counter" to --counted--.

Signed and Sealed this

Seventh Day of December, 1993

*Attest:*

BRUCE LEHMAN

*Attesting Officer*     Commissioner of Patents and Trademarks